United States Patent [19]
Jellinek et al.

[11] Patent Number: 4,810,751
[45] Date of Patent: Mar. 7, 1989

[54] ACRYLIC EMULSION COPOLYMERS

[75] Inventors: Thomas Jellinek, Plenty; Gregory C. Bain, Pascoe Vale, both of Australia

[73] Assignee: Commonwealth Scientific and Industrial Research Organization, Australia

[21] Appl. No.: 872,666
[22] PCT Filed: Sep. 3, 1985
[86] PCT No.: PCT/AU85/00210
§ 371 Date: Jun. 11, 1986
§ 102(e) Date: Jun. 11, 1986
[87] PCT Pub. No.: WO86/01519
PCT Pub. Date: Mar. 13, 1986

[30] Foreign Application Priority Data
Sep. 3, 1984 [AU] Australia .............. PG6897

[51] Int. Cl.$^4$ .............................................. C08J 39/00
[52] U.S. Cl. .................... 524/811; 524/548; 526/273
[58] Field of Search ............... 524/548, 811; 526/273

[56] References Cited
U.S. PATENT DOCUMENTS

| | | | |
|---|---|---|---|
| 3,242,123 | 3/1966 | Mayfield et al. | 524/811 |
| 3,336,149 | 8/1967 | Fox et al. | 524/811 |
| 3,350,339 | 10/1967 | Sekmakas | 524/811 |
| 3,729,338 | 4/1973 | Lehmann et al. | 428/355 |
| 3,810,859 | 5/1974 | Mikofalvy | 524/811 |
| 4,623,679 | 11/1986 | Gimpel et al. | 524/811 |

FOREIGN PATENT DOCUMENTS

| | | | |
|---|---|---|---|
| 2519589 | 11/1975 | Fed. Rep. of Germany | 524/811 |
| 0140463 | 3/1980 | Fed. Rep. of Germany | 524/811 |
| 0045732 | 3/1980 | Japan | 524/811 |

Primary Examiner—Joseph L. Schofer
Assistant Examiner—J. M. Reddick
Attorney, Agent, or Firm—Bacon & Thomas

[57] ABSTRACT

Aqueous emulsion copolymer composition useful as a textile treatment to provide superior durability to repeated washing and dry cleaning and increased stability to prolonged heat and light, to methods of preparing the aqueous emulsion polymers and to methods of treating textile materials with the compositions. The aqueous emulsion is characterized as being a thermally self-crosslinkable copolymer having a molecular weight in the range 50,000 to 10,000,000, a second order transition temperature (Tg) in the range $-40°$ C. to $+30°$ C. comprising:

(a) 0.5 to 3% by weight of itaconic acid,
(b) 2 to 12% by weight of glycidyl methacrylate,
(c) 1 to 7% by weight of N-methylol acrylamide or N-methylol methacrylamide,
(d) 35 to 96.5% by weight of ethylacrylate, and
(e) at least one compatible monoethylenically unsaturated monomer.

13 Claims, No Drawings

ACRYLIC EMULSION COPOLYMERS

The present invention relates to thermally self-crosslinkable emulsion copolymers which may be used as binders, impregnants and/or coatings on textile substrates and in other textile treatments.

Emulsion polymers useful in the aforementioned applications have become a well known article of commerce and are based on such well known monomers as the acrylic esters, butadiene, styrene, vinyl acetate or vinyl chloride. The utility of crosslinkable polymers normally applies to those areas which require durability to repeated washing and drycleaning, and stability to prolonged exposure to heat and light. It is also possible to manufacture emulsion polymers in a wide range of flexibilities which can be tailored to suit particular applications. Some important applications where the highest standards of performance are routinely demanded of emulsion polymers include binders for nonwoven fabrics, adhesives for flocking and laminating of textile, coatings for fabrics and as binders for the pigment printing of textiles. Aqueous emulsions of such polymers are required to become substantially durable as binders, impregnants or coatings when dried and crosslinked with or without additional heat treatment on the textile substrate.

According to one aspect of the present invention there is provided an aqueous emulsion of a thermally self-crosslinkable copolymer having a molecular weight in the range 50,000 to 10,000,000, a second order of transition temperature ($T_g$) in the range $-40°$ C. to $+30°$ C. and useful as a binder, impregnant and/or coating for textiles comprising
(a) 0.5 to 3% by weight of itaconic acid,
(b) 2 to 12% by weight of glycidyl methacrylate,
(c) 1 to 7% by weight of N-methylol acrylamide or N-methylol methacrylamide,
(d) 35 to 96.5% by weight of ethyl acrylate, and at least one other compatible monoethylenically unsaturated monomer.

According to another aspect of the present invention there is provided an aqueous emulsion of a thermally self-crosslinkable copolymer having a molecular weight in the range 50,000 to 10,000,000, a second order of transition temperature ($T_g$) in the range $-40°$ C. to $+30°$ C. and useful as a binder, impregnant and/or coating for textile comprising
(a) 0.5 to 3% by weight of itaconic acid,
(b) 2 to 12% by weight of glycidyl methacrylate,
(c) 1 to 7% by weight of N-methylol acrylamide or N-methylol methacrylamide,
(d) 35 to 96.5% by weight of ethyl acrylate,
(e) 0 to 20% by weight of methyl acrylate,
(f) 0 to 50% by weight of a monomer or combination of monomers comprising methyl methacrylate, butyl acrylate, propyl acrylate or 2-ethylhexyl acrylate.

The copolymers may be prepared in a conventional manner by emulsion polymerisation of the monomers. The aqueous emulsion contains from 30 to 65%, preferably from 40 to 55% by weight of the said copolymers.

It has been surprisingly found that a synergistic effect is obtained by the particular combination of functional monomers (i.e. those monomers having reactive groups expected to participate in crosslinking reactions), namely components (a), (b) and (c) when incorporated into a polymer backbone, such as for example in one form of the invention comprising components (d), (e) and (f). The surprising observation was that this effect is not obtained when any of the components (a), (b) or (c) is omitted or when alternative conventional backbone compositions are employed, such as those backbones not containing component (d) and optionally containing components (e) and (f).

According to another aspect of the present invention there is provided an aqueous emulsion of a thermally self-crosslinkable copolymer having a molecular weight in the range 50,000 to 10,000,000, a second order transition temperature in the range $-20°$ C. to $+30°$ C., and being useful as a binder, impregnant and/or coating for textiles comprising
(a) 0.5 to 3% by weight of itaconic acid,
(b) 2 to 12% by weight of glycidyl methacrylate,
(c) 1 to 7% by weight of N-methylol acrylamide or N-methylol methacrylamide,
(d) 35 to 96.5% by weight of ethyl acrylate,
(e) 4 to 20% by weight of methyl acrylate,
(f) 0 to 50% by weight of methyl methacrylate, and not more than 15% of other compatible monomers.

A typical polymer backbone of this form of the invention comprises ethyl acrylate, about 10% by weight methyl acrylate, and the remainder being methyl methacrylate.

In a still further embodiment of this invention there is provided an aqueous emulsion of a thermally self-crosslinkable copolymer having a molecular weight in the range 50,000 to 10,000,000, a second order transition temperature in the range $-40°$ C. to $-15°$ C., and being useful as a binder, impregnant and/or coating for textiles comprising
(a) 0.5 to 3% of itaconic acid
(b) 2 to 12% of glycidyl methacrylate
(c) 1 to 7% of N-methylol acrylamide or N-methylol methacrylamide
(d) 35 to 96.5% of ethyl acrylate
(e) 0 to 6% of methyl acrylate
(f) 0 to 50% of a monomer or combination of monomers comprising propyl acrylate, butyl acrylate or 2-ethylhexyl acrylate and
not more than 15% of other compatible monomers.

A typical polymer backbone of this form of the invention would comprise ethyl acrylate and butyl acrylate in amounts depending on the desired $T_g$ required.

A typical amount of the functional monomers in the copolymer of this form of the invention would be about 1% by weight of itaconic acid, about 3 to 6% by weight of glycidyl methacrylate, and 2 to 4% by weight of N-methylol acrylamide.

According to another aspect of the present invention there is provided a method of treating a textile material comprising applying an aqueous emulsion of a copolymer made in accordance with the present invention to the textile material, drying and heat curing the copolymer on the textile material.

One of the treatments would be the application of textile printing pastes, while another form of the treatment would be the application of adhesives, such as for example in the manufacture of flocked fabrics, while still another form would be the application of binder compositions.

Particularly suitable compatible monomers of the compatible monoethylenically unsaturated other monomer to be used in the preparation of the copolymers are acrylic or methacrylic acid esters of alkanols of 1 to 8 carbon atoms such as those not already mentioned in the foregoing. Suitable monomers include t-butyl acrylate, or ethyl, propyl or butyl methacrylates.

The aqueous emulsion of a thermally self-crosslinkable polymer may be prepared in a conventional manner by emulsion polymerisation, using the conventional free radical polymerisation initiators and emulsifiers with or without regulators.

Nonionic and/or anionic emulsifiers are in general employed for this purpose in an amount of from 0.1 to 10, preferably from 1 to 7% by weight, based on the monomers. Examples of nonionic emulsifiers are the adducts of ethylene oxide with fatty alcohols, e.g. lauryl, myristyl, cetyl, stearyl and oleyl alcohol, with fatty acids, e.g. lauric, myristic, palmitic, stearic and oleic acid, with their amides, and with alkylphenols, e.g., isooctylphenol, isononylphenol and dodceylphenol. Further examples are reaction products of ethylene oxide with etherified or esterified polyhydroxy compounds having a relatively long alkyl chain, e.g. sorbitol monostearate. The above oxyalkylation products in general contain from 5 to 120 moles of ethylene oxide units, oxyalkylation products of the above type, which contain propylene oxide in addition to ethylene oxide may also be used.

Examples of anionic emulsifiers are fatty acids of 6 to 18 carbon atoms, resin acids, fatty alcohol sulfates of 4 to 18 carbon atoms, alkylsulfonates of 10 to 18 carbon atoms, alkylarysulfonates of 10 to 18 carbon atoms, hydroxyalkylsulfonates of 4 to 18 carbon atoms, alkali metal salts and ammonium salts of sulfosuccinic acid esters, and sulfonated adducts of ethylene oxide with fatty alcohols, fatty amides, fatty acids or alkylphenols. The preferred emulsifiers are nonionic and are condensates of ethylene oxide with alkylphenols containing from 20 to 120 moles of ethylene oxide.

Examples of suitable initiators are inorganic peroxy compounds, e.g. hydrogen peroxide, sodium, potassium or ammonium peroxydisulfates, peroxycarbonates and borate peroxyhydrates, as well as organic peroxy compounds, e.g. acyl hydroperoxides, diacyl peroxides, alkyl hydroperoxides, dialkyl peroxides and esters, e.g. tert-butyl perbenzoate. The amount of initiator used is in general from 0.01 to 5% by weight based on total monomers. The above peroxy compounds can also be employed as redox catalysts in combination with reducing agents. Examples of suitable reducing agents are alkali metal disulfites, alkali metal bisulfites, ammonium bisulfites, thiosulfates, dithionites and formaldehydesulfoxylates, as well as iron-II sulfate, titanium-III sulfate, glucose and ascorbic acid. where redox catalysts are employed, the presence of promotors is often advantageous. For example, traces of metal salts, especially of copper, manganese, iron, cobalt and/or nickel salts, may be used as promotors. The emulsion polymerisation is preferably carried out in the presence of a redox initiator.

Examples of suitable regulators are carbon tetrachloride, trichlorobromomethane, tetrachloroethane, methallyl chloride, alcohols, e.g. isopropanol and dodecanol, alkyl mercaptans and dialkyl xanthates, e.g. diisopropyl xanthate disulfide. The emulsion polymerisation is in general carried out at from 10° C. to 95° C., preferably from 40° C. to 70° C., at a pH which is in general from 1 to 9. The emulsions obtained generally contain from 30 to 60% by weight of copolymer.

In the process of preparing the aqueous emulsion of the thermally self-crosslinkable copolymer, the emulsion copolymerisation employs a monomer feed or an emulsion feed process wherein a part or all of the monomers are added continuously to the charge during the course of the polymerisation. In such a process, it is in general advantageous to have a separate, simultaneous feed of initiators and emulsifiers, though a part of these may also be included in the monomer feed (e.g. emulsifiers) if compatible. The preferred method is to employ a pre-emulsion feed containing all of the monomers and at least part of the emulsifiers.

In addition to containing a thermally self-crosslinkable copolymer, the novel aqueous emulsions may also contain conventional additives, for example pigments, antioxidants, dyes, plasticisers, film forming assistants, UV absorbers, flame retardants, thickeners, solvents, humectants and the like in conventional amounts. They may be used particularly advantageously as adhesives for flocking and laminating, binders for pigment printing and for bonding nonwovens where the provide outstanding fastness properties without need for external crosslinking agents. The textile substrates may be composed of the conventional natural and synthetic fibres, for example cotton, wool, polyethyleneglycol terephthalate, nylons, polyolefins, polyacrylonitrile, rock wool, asbestos fibres and the like. They may also be applied to sheet-like textiles, paper, films and metallic articles.

In one form of the invention, where the emulsions are applied as textile printing pastes, they may be used in conventional oil in water pastes, in all aqueous pastes, or in foamed systems and applied using conventional equipment such as flat screens, rotary screens, engraved rollers etc. Alternative application methods, of say other forms of the invention, when used as adhesives, binders and/or coatings include knife coating, transfer coating, roller coating, impregnation, foam impregnation, padding, spraying, printing and the like. After the textiles have been treated with the novel emulsions of the present invention and the excess removed, for example by squeezing off, the treated textile is in general dried and heat-cured in a one or two step operation. Drying may be carried out, for example, for from 1 to 10 minutes at from 100° C. to 170° C., and heat-curing for from 0.5 to 3 minutes at from 100° C. to 200° C., or alternatively these operations may be carried out simultaneously for 1 to 10 minutes at 100° C. to 200° C. In general the copolymer is applied in an amount appropriate to the bonding requirement, so that a pigment print paste may contain from 2 to 10% copolymer solids, a flocking adhesive from 15 to 50% copolymer solids, and an impregnant for nonwoven fabrics at from 5 to 40% copolymer solids.

The emulsions according to the invention are crosslinked in a weakly acid pH range under comparatively mild conditions when compared to conventional binders. The optimum times and temperatures for any particular application depend on film thickness and the acid content. Suitable acid catalysts are mineral acids and organic acids, such as phosphoric acid, tartaric acid, citric acid, or acid salts, such as chromium-III salts, aluminium chloride, ammonium chloride, zinc nitrate, or magnesium chloride. A particular advantage is that crosslinking can be effected with minimal or no added acid in formulations containing conventional polyacid thickeners so that added electrolytes can be kept to a minimum. Electrolytes in general reduce the viscosity of solutions thickened with synthetic polyacid thickeners (such as polyacrylic acid) and at sufficiently high levels can render such thickeners useless. A further advantage is that films do not discolour on crosslinking and have higher strength and better resistance to aqueous and organic media than presently known copolymers, even when the latter are further crosslinked with added melamine, or urea-formaldehyde crosslinkers. A further characteristic of the emulsion copolymers according to the invention is that they are characterised by excellent mechanical and storage stability, despite their crosslinking capacity.

One of the advantages of the present invention is that the resulting textiles when treated with the copolymers made in accordance with the present invention have improved fastness to washing, drycleaning and abrasion and these properties are achieved using comparatively mild curing conditions and without added external crosslinking agents.

Another such advantage is that the inclusion of crosslinking agents often leads to undesirable stiffening of the handle of the treated textile and substantially increases the amount of formaldehyde which is eliminated during drying and subsequent heat curing. This constitutes a nuisance to those concerned with the production of the particular goods. It may also constitute a potential hazard to the ultimate user since the elimination of formaldehyde can continue indefinitely at room temperature and can lead to skin irritation and possibly more serious health hazards. Thus the wash and dryclean fastness of these conventional copolymers can only meet the highest standards of performance when these external crosslinking agents are included in the formulation. The present invention, on the other hand, does not involve the use of externally added crosslinking agent which may have deleterious effects.

A further disadvantage of these conventional copolymers is that considerable energy must be expended in the heat curing stage in order that the degree of crosslinking is sufficient to impart the desired high standards of durability. The present high cost of energy highlights the need for copolymers which will achieve these standards with minimal energy cost.

The following examples illustrate the practice of the invention without being limitative in any respect. In the examples, parts and percentages are by weight.

EXAMPLE 1

A. Preparation of an emulsion copolymer having a monomer composition: 56% ethyl acrylate, 37% butyl acrylate, 4% glycidyl methacrylate, 2% N-methylol acrylamide, 1% itaconic acid.

A mixture of 578 parts of deionised water, 4.5 parts of a 40 mole ethoxylate of octyl phenol, 1.1 parts of a 100 mole ethoxylate of nonyl phenol, 1.0 part of sodium bicarbonate, and 0.4 parts of sodium formaldehyde sulfoxylate was prepared and charged to a glass reactor fitted for mechanical stirring, temperature control, reflux, nitrogen purging and continuous addition of monomer emulsion and initiator solution in separate feeds. The mixture was heated to 55° C., under a nitrogen atmosphere, and 20 parts of a 2% solution of ammonium persulfate were added. While stirring the mixture at 55° C., a monomer emulsion of 448 parts of ethyl acrylate, 296 parts of butyl acrylate, 32 parts of glycidyl methacrylate, 16 parts of N-methylol acrylamide, 8 parts of itaconic acid, emulsified in 307 parts of deionised water, 27.5 parts of a 40 mole ethoxylate of octyl phenol, 6.9 parts of 100 mole ethoxylate of nonyl phenol and 1.6 parts of sodium formaldehyde sulfoxylate; and an initiator feed of 80 parts of a 2% solution of ammonium persulfate, were added simultaneously over 2½ hours. The temperature was maintained at 55° C. for a further 2 hours, after which the emulsion was cooled and filtered through cheesecloth. The solids content of the emulsion was 46.0% and it had a glass transition temperature of −29° C.

B. A flocking adhesive was prepared with the following formulation:

Polymer of A above: 20% solids
Thickener (see below): 0.6% solids
Ammonia to give pH 7-8

The thickener was an alkali soluble acrylic emulsion, essentially a copolymer of 60% ethyl acrylate and 40% methacrylic acid. The type and method of preparation will be familiar to one skilled in the art. The resulting paste had a viscosity of 35,000 cps (Brookfield spindle 6, 10 r.p.m.).

A laboratory knife coating apparatus was used to coat a bleached 50:50 polyester/cotton fabric (230 g/m>) and a nylon flock (1.0 mm, 1.5 denier) was applied by an electrostatic hand flocking apparatus. The fabric was then cured in a forced draught oven at 150° C., for 5 minutes.

Flocked samples were then washed for 4 hours in a 50 l Cubex International Machine using 12.5 l of liquor at 60+ C. containing 0.01% of an alkylphenol polyglycol either (8 EO) surfactant and a 1 kg load of polyester make-weights. Dryclean tests were carried out for 1 hour in a Launder-o-meter using 100 steel balls in perchloroethylene. In both cases, samples were weighed to constant weight before and after testing, and the percent weight loss recorded. After washing the percent weight loss was 2.2%, and after drycleaning the percent weight loss was 1.7%.

C. An emulsion copolymer having monomer composition: 10% methyl acrylate, 83% ethyl acrylate, 4% glycidyl methacrylate, 2% N-methylol acrylamide, 1% itaconic acid was prepared as in example 1A. The emulsion had a solids content of 46.0% and a glass transition temperature of −14° C.

Flocked samples were prepared and tested as in example 1B above. After washing, the percent weight loss was 0.6%, and after dry-cleaning the percent weight loss was 0.1%.

COMPARATIVE EXAMPLES (1D to 1S)

A series of emulsion co-polymers were prepared outside the scope of this invention in order to establish the unique performance of the products of the present invention. In all cases, emulsion copolymers were prepared by the same method as in example 1A above. Flocked samples were then prepared and tested as in example 1B above. Table 1 lists the monomer compositions of the various emulsion copolymers, and their glass transition temperatures. Percentage weight losses upon washing and drycleaning (as described in example 1B above) are also included:

TABLE 1

COMPARATIVE EXAMPLES OF MONOMER COMPOSITIONS, AND FLOCKING TEST RESULTS

| Example | Monomer Composition[a] % Backbone | | Functional | | $Tg^b$ (°C.) | % weight loss Wash | Dry-clean |
|---|---|---|---|---|---|---|---|
| 1D | MA/EA | 10:84 | GMA/MlAM | 4:2 | −14 | 11.2 | 0.7 |
| 1E | MA/EA | 10:83 | GMA/IA | 6:1 | −14 | 13.4 | 0.8 |
| 1F | MA/EA | 10:87 | MlAM/IA | 2:1 | −15 | 7.8 | 0.7 |
| 1G | MA/EA | 10:83 | GMA/MlAM/MAM | 4:2:1 | −14 | 7.7 | 0.6 |
| 1H | MA/EA | 10:83 | GMA/MlAM/MAM | 4:2:1 | −14 | 9.8 | 1.3 |
| 1I | MA/EA | 10:82 | GMA/AM | 6:2 | −14 | 12.9 | 0.5 |
| 1J | MA/EA | 10:87 | GlAM/AM | 2:1 | −16 | 7.1 | 0.5 |
| 1K | MA/EA | 10:80 | GMA | 10 | −14 | 13.7 | 0.8 |
| 1L | MA/EA | 10:87 | MlAM | 3 | −15 | 8.8 | 0.7 |
| 1M | EA/BA | 70:27 | MlAM/IA | 2:1 | −29 | 8.3 | 1.6 |
| 1N | 2-EHA/MMA | 56:41 | MlAM/IA | 2:1 | −30 | 12.2 | 18.1 |
| 1O | BA/BMA | 40:50 | GMA | 10 | −14 | 20.7 | 35.2 |
| 1P | BA/BMA | 42:51 | GMA/MlAM/IA | 4:2:1 | −14 | 13.8 | 27.6 |
| 1Q | VAC/BA | 45:48 | GMA/MlAM/IA | 4:2:1 | −14 | 16.5 | 12.4 |
| 1R | St/BA | 30:63 | GMA/MlAM/IA | 4:2:1 | −15 | 12.9 | 22.5 |
| 1S | BA/BMA | 45:42 | GMA/MlAM | 10:3 | −14 | 19.3 | 31.4 |

[a]where MA = methyl acrylate
EA = ethyl acrylate
BA = butyl acrylate
MMA = methyl methacrylate
BMA = butyl methacrylate
2-EHA = 2-ethylhexyl acrylate
VAC = vinyl acetate
St = styrene
GMA = glycidyl methacrylate
MlAM = N—methylol acrylamide
IA = itaconic acid
AM = acrylamide
MAM = methacrylamide
[b]Tg = glass transition temperature

EXAMPLE 2

A. A flocking adhesive was prepared with the following
formulation:
Polymer of 1A above: 20.0% solids
Thickener of 1B above: 0.6% solids
Ammonium nitrate: 0.1% solids
Ammonia to give pH 7-8
Ammonium nitrate is a latent acid catalyst.

The resulting paste had a viscosity of 33,000 cps (Brookfield spindle 6, 10 r.p.m.). Flocked samples were prepared and tested as in example 1B above. After washing, the percentage weight loss was 2.1%, and after drycleaning, the percentage weight loss was 1.7%.

B. A flocking adhesive was prepared with the following formulation:
Polymer of 1A above: 20.0% solids
Hydroxyethyl cellulose (thickener): 1.0% solids
Ammonium nitrate: 0.1% solids The resulting paste had a viscosity of 32,000 cps (Brookfield spindle 6, 10 r.p.m.). Flocked samples were prepared and tested as in example 1B above. After washing, the percentage weight loss was 2.3% and after drycleaning the percentage weight loss was 1.4%.

COMPARATIVE EXAMPLE 2

An emulsion copolymer having monomer composition methyl acrylate 10%, ethyl acrylate 83%, glycidyl methacrylate 6%, itaconic acid 1% was prepared as in example 1A above. A flocking paste was prepared as in example 2B above, and flocked fabrics prepared and tested as in example 1B above. After washing the percentage weight loss was 14.6%, and after drycleaning the percentage weight loss was 1.7%.

EXAMPLE 3

A. A textile treatment bath was formulated with the following composition:
Polymer of 1A above: 12.00% solids
Wetting agent: 0.05% solids
(an alkoxypolyethoxy ethanol surfactant)

A 100% carded polyester web was impregnated with the aqueous composition on a laboratory pad mangle to give a wet pick-up of 250%. The fabric was dried and cured for 3 minutes at 150° C. in a forced draught oven. The resulting non-woven fabric was washed for 3 hours at 60° C. in a 50 l Cubex International machine with 12.5 l wash liquor, containing 0.01% of an alkylphenolpolyglycol ether (8 EO) surfactant, and a 1 kg load of polyester make-weights. The percentage weight loss was 0.4%. Dryclean tests were carried out for 30 minutes in a Launder-o-meter. The percentage weight loss was 0.7%. Tensile tests were performed on an Instron tensile tester with a jaw separation of 5 cm, and an extension rate of 2 cm/min. Samples were cut to 2.5 cm × 10 cm size. The non-woven fabric described above had a dry tensile strength of 2.48 kN/m and a wet tensile strength of 1.65 kN/m.

B. A textile treatment bath was prepared as in example 3A above, except that polymer of example 1C above was substituted for the polymer of example 1A above.

Non-woven fabrics were prepared and tested as in example 3A above. After washing, the percentage weight loss was 0.5%. After drycleaning the percentage weight loss was 0.8%. Dry tensile strength was 4.67 kN/m and wet tensile strength was 3.12 kN/m. In both examples 3A and 3B, the non-woven fabrics had almost no surface pilling after washing or drycleaning.

EXAMPLE 4

A. A crushed foam backcoated fabric was prepared from the following formulation:

Polymer in example 1C above: 65 parts
Titanium dioxide (70% dispersion): 10 parts
Talc (60% dispersion): 20 parts
Ammonium stearate (33% dispersion): 5 parts The titanium dioxide and talc act as pigments and fillers, and the ammonium stearate is a foaming aid. The composition is beaten into a stable foam of density 0.2 g/cm<, and coated onto a 50:50 cotton/polyester woven fabric. The coated fabric is then dried and crushed between rollers, and cured at 150° C. for 3 minutes in a forced draught oven. The methods and conditions employed will be familiar to one experienced in the art. The resultant coated fabric was washed as described in example 1B above, giving a weight loss of 0.9%. After drycleaning as described in example 1B above, the weight loss was 0.7%. In both tests there was no sign of damage of change to the coated fabric.

COMPARATIVE EXAMPLE 4

A series of emulsion copolymers tested as flocking adhesives in examples 1D-S were tested in the crushed foam backcoating of fabrics. Monomer compositions, glass transition temperatures, and percentage weight losses in washing and drycleaning tests (as described in example 1B above) are given in Table 2.

A blue pigment dyed fabric was produced by padding the above liquor onto a 50:50 cotton/polyester woven fabric at 100% wet pick-up, and drying and curing at 150° C. for 3 minutes in a forced draught oven. The resultant pigment dyed fabric had an even blue colour which was durable to washing, drycleaning and wet and dry rubbing.

EXAMPLE 7

A. A pigment printing paste was prepared with the following formulation:
Water: 84 parts
Thickener (see below): 2 parts
Softener (see below): 3 parts
Polymer of example 1A above: 10 parts
C.I. Pigment Blue 15: 1 part
(35% dispersion of a copper phthalocyanine)

The thickener was an oil-based dispersion of a partially crosslinked polyacrylic acid (15%), containing neutralising agent. The softener was an aqueous emulsion of selected organic plasticising agents such as epoxidised vegetable oil. Both these components are of the type commonly used in pigment printing pastes, and the type and preparation of each will be familiar to one skilled in the art. A hand screen-printing apparatus was used to apply the paste to a 50:50 cotton/polyester woven fabric. The resulting prints had a very soft handle, the colour was bright and extremely durable to washing, drycleaning, wet and dry rubbing, and showed exceptional resistance to light aging.

The test methods used in determining the durability to washing, drycleaning and rubbing are as follows:
Washing and dry cleaning: As described in example 1B above. Evaluated according to the Grey Scale for Assessing Change in colour. (B.S. 2662:1961)
Dry and Wet Rubbing:
According to AATCC Test Method 8-1977.
Evaluated according to Grey Scale for
Assessing Staining (B.S. 2663:1961).

In all evaluations involving the Grey Scales, a value of 5 means unchanged, while a value of 1 means severely changed.

B. Pigment printing pastes were prepared using various emulsion copolymers, but all using the thickener, softener and pigment, and formulation described in example 7A above. The results for emulsions according to the invention are shown in Table 3 and for comparative examples in Table 4.

TABLE 2

COMPARATIVE EXAMPLES (4B-4G) OF MONOMER COMPOSITIONS, AND CRUSHED FOAM BACKCOATING TEST RESULTS

| Example | Monomer Composition % | | | | (°C.) | % weight loss | |
|---|---|---|---|---|---|---|---|
| | Backbone | | Functional | | | Wash | Dry-clean |
| 4B | MA/EA | 10:84 | GMA/MIAM | 4:2 | −14 | 8.8 | 1.3 |
| 4C | MA/EA | 10:83 | GMA/IA | 6:1 | −14 | 12.1 | 1.7 |
| 4D | MA/EA | 10:87 | MIAM/IA | 2:1 | −15 | 9.4 | 1.8 |
| 4E | MA/EA | 10:83 | GMA/MIAM/AM | 4:2:1 | −14 | 9.7 | 1.3 |
| 4F | 2-EHA/MMA | 56:41 | MIAM/IA | 2:1 | −30 | 15.7 | 16.1 |
| 4G | VAC/BA | 45:48 | GMA/MIAM/IA | 4:2:1 | −14 | 21.4 | 9.8 |

EXAMPLE 5

An adhesive for fabric lamination was prepared with the following formulation:
Polymer of example 1C above: 98 parts
Thickener of exmaple 1B above: 2 parts
Ammonia to give pH 7-8

The resultant paste had a viscosity of 72,000 cps (Brookfield spindle 6, 10 r.p.m.). The adhesive was used to laminate various fabrics together, including cotton/polyester to cotton/polyester, cotton/polyester to acetate tricot, cotton/polyester to nylon tricot, and cotton to cotton/polyester.

In all cases, a strong bond was obtained, which was extremely durable to both washing and drycleaning.

EXAMPLE 6

A textile treatment bath was prepared with the following formulation:
Polymer of example 1A above: 4% solids Wetting agent
  (an alkoxy polyethoxyethanol); 0.05% solids
C.I. Pigment Blue 15 (35% dispersion): 0.5% solids

TABLE 3

EXAMPLES ACCORDING TO THE INVENTION (7C-7F).
MONOMER COMPOSITIONS, GLASS TRANSITION TEMPERATURES, AND
TEST RESULTS FOR PIGMENT PRINTING

| Example | Monomer Composition Backbone | | Functional | | Tg (°C.) | Test Results Wash | Dry-Clean | Dry Rib | Wet Rub |
|---|---|---|---|---|---|---|---|---|---|
| 7C | EA/BA | 56:37 | GMA/M1AM/IA | 4:2:1 | −29 | 5 | 5 | 4/5 | 4 |
| 7D | MA/EA | 10:83 | GMA/M1AM/IA | 4:2:1 | −14 | 5 | 5 | 4 | 3 |
| 7E | MA/EA/MMA | 10:66:17 | GMA/M1AM/IA | 4:2:1 | +2 | 5 | 5 | 4 | 3 |
| 7F | MA/EA/MMA | 10:41:42 | GMA/M1AM/IA | 4:2:1 | +30 | 5 | 5 | 3 | 3 |

TABLE 4

COMPARATIVE EXAMPLES (7G-7V).
MONOMER COMPOSITIONS, GLASS TRANSITION TEMPERATURES, AND
TEST RESULTS FOR PIGMENT PRINTING

| Example | Monomer Composition Backbone | | Functional | | Tg (°C.) | Test Results Wash | Dry-Clean | Dry Rub | Wet Rub |
|---|---|---|---|---|---|---|---|---|---|
| 7G | MA/EA | 10:84 | GMA/M1AM | 4:2 | −14 | 3 | 4 | 4 | 3 |
| 7H | MA/EA | 10:83 | GMA/IA | 6:1 | −14 | 3 | 4 | 3 | 3 |
| 7I | MA/EA | 10:87 | M1AM/IA | 2:1 | −15 | 3 | 4 | 3 | 3 |
| 7J | MA/EA | 10:83 | GMA/M1AM/AM | 4:2:1 | −14 | 4 | 4 | 3 | 3 |
| 7K | MA/EA | 10:83 | GMA/M1AM/MAM | 4:2:1 | −14 | 3 | 4 | 3 | 3 |
| 7L | MA/EA | 10:82 | GMA/AM | 6:2 | −14 | 2 | 3 | 3 | 3 |
| 7M | MA/EA | 10:87 | M1AM/AM | 2:1 | −16 | 3 | 4 | 3 | 3 |
| 7N | MA/EA | 10:80 | GMA | 10 | −14 | 1 | 3 | 3 | 3 |
| 7O | MA/EA | 10:87 | M1AM | 3 | −15 | 2 | 4 | 3 | 3 |
| 7P | EA/BA | 70:27 | M1AM/IA | 2:1 | −29 | 3 | 4 | 4 | 3 |
| 7Q | 2-EHA/MMA | 56:41 | M1AM/IA | 2:1 | −30 | 3 | 1 | 3 | 3 |
| 7R | BA/BMA | 40:50 | GMA | 10 | −14 | 1 | 1 | 3 | 3 |
| 7S | BA/BMA | 42:51 | GMA/M1AM/IA | 4:2:1 | −14 | 3 | 3 | 3 | 3 |
| 7T | VAC/BA | 45:48 | GMA/M1AM/IA | 4:2:1 | −14 | 1 | 2 | 3 | 2 |
| 7U | St/BA | 30:63 | GMA/M1AM/IA | 4:2:1 | −15 | 3 | 2 | 3 | 3 |
| 7V | BA/BMA | 45:42 | GMA/M1AM | 10:3 | −14 | 2 | 3 | 3 | 3 |

Those skilled in the art will appreciate that the invention described herein is susceptible to variations and modifications other than those specifically described. It is to be understood that the invention includes all such variations and modifications which fall within its spirit and scope.

We claim:

1. A thermally self-crosslinkable emulsion copolymer having a molecular weight in the range of 50,000 to 10,000,000, a second order transition temperature (Tg) in the range of −40° C. to 30° C. and useful in treating textiles comprising:
   (a) 0.5 to 3% by weight of itaconic acid,
   (b) 2 to 12% by weight of glycidyl methacrylate,
   (c) 1 to 7% b weight of N-methylol acrylamide or N-methylol methacrylamide,
   (d) 35 to 96.5% by weight of ethylacrylate, and
   (e) at least one compatible monoethylenicially unsaturated monomer, selected from the group consisting of methyl acrylate, methyl methacrylate, butyl acrylate, propyl acrylate and 2-ethyl hexyl acrylate; said copolymer produced by means of aqueous emulsion polymerization.

2. An emulsion copolymer according to claim 1 in which the unsaturated monomer (e) comprises methyl acrylatein an amount of up to 20% by weight.

3. An emulsion copolymer according to claim 1 in which the unsaturated monomer (e) comprises one or more of methyl methacrylate, butyl acrylate, propyl acrylate or 2-ethyl hexyl acrylate in an amount of from up to 50% by weight.

4. An emulsion copolymer according to claim 1 in which the second order transition temperature is in the range −20° C. to 30° C. and the unsaturated monomer (e) comprises from 4 to 20% by weight methyl acrylate and from 0 to 50% by weight methyl methacrylate.

5. An emulsion copolymer according to claim 1 in which the unsaturated monomer (e) comprises about 10% by weight methyl acrylate and the remainder is methyl methacrylate.

6. An emulsion copolymer according to claim 1 having a second order transition temperature in the range −40° C. to −15° C. and the unsaturated monomer comprises 0 to 6% by weight of methyl acrylate, 0 to 50% by weight of one or more of propyl acrylate, butyl acrylate, or 2-ethylhexyl acrylate and not more than 15% of other compatible monomers.

7. An emulsion copolymer according to claim 1 having 1% by weight itaconic acid.

8. An emulsion copolymer according to claim 1 having from about 3 to 6% by weight glycidyl methacrylate.

9. An emulsion copolymer according to claim 1 having about 2 to 4% by weight N-methylol acrylamide.

10. An emulsion copolymer according to claim 1 further comprising as the compatible monoethylenically unsaturated monomer acrylic or methacrylic acid esters of alkanols of 1 to 8 carbon atoms including t-butyl acrylate, and ethyl, propyl or butyl methacrylates.

11. An aqueous emulsion of a copolymer according to claim 1 further comprising an additive selected from the group comprising pigments, antioxidants, dyes, plasticisers, film forming assistants, UV absorbers, flame retardants, thickening agents, solvents and humectants.

12. An aqueous emulsion according to claim 11 containing from 30 to 65% by weight of the copolymer.

13. An aqueous emulsion according to claim 12 containing from 40 to 55% by weight of the copolymer.

* * * * *